(12) United States Patent
 Vandervort

(10) Patent No.: US 12,428,089 B2
(45) Date of Patent: Sep. 30, 2025

(54) ADJUSTABLE FOOTREST PEG MOUNT ASSEMBLY

(71) Applicant: Harley-Davidson Motor Company Group, LLC, Milwaukee, WI (US)

(72) Inventor: Carl Joseph Vandervort, Milwaukee, WI (US)

(73) Assignee: HARLEY-DAVIDSON MOTOR COMPANY, INC., Milwaukee, WI (US)

( * ) Notice: Subject to any disclaimer, the term of this patent is extended or adjusted under 35 U.S.C. 154(b) by 412 days.

(21) Appl. No.: 18/054,738

(22) Filed: Nov. 11, 2022

(65) Prior Publication Data

US 2024/0158039 A1    May 16, 2024

(51) Int. Cl.
*B62J 25/06*    (2020.01)
(52) U.S. Cl.
CPC ..................... *B62J 25/06* (2020.02)
(58) Field of Classification Search
CPC ....................................................... B62J 25/06
See application file for complete search history.

(56) References Cited

U.S. PATENT DOCUMENTS

| | | | | |
|---|---|---|---|---|
| 6,957,821 | B2* | 10/2005 | Gorman | B62J 25/06 74/564 |
| 7,114,739 | B2* | 10/2006 | Colano | B62J 25/04 74/564 |
| 7,637,523 | B2* | 12/2009 | Fouhy | B62J 25/06 74/564 |
| 8,181,982 | B1* | 5/2012 | Ward | B62J 25/04 74/564 |
| 8,870,207 | B2* | 10/2014 | Parvey | B62J 25/04 296/5 |
| 9,352,795 | B2 | 5/2016 | Parvey | |
| 10,220,903 | B2* | 3/2019 | LaCasse-Jobin | B62M 17/00 |
| 10,745,074 | B2* | 8/2020 | Griffin | B62L 3/04 |
| 10,953,945 | B2 | 3/2021 | Maraia et al. | |
| 11,148,751 | B2* | 10/2021 | Laberge | B62K 5/05 |
| 2007/0057484 | A1* | 3/2007 | Gilman | B62J 25/06 280/291 |
| 2015/0217826 | A1* | 8/2015 | Parvey | B62J 25/06 280/291 |
| 2020/0130766 | A1* | 4/2020 | Maraia | B62J 25/06 |

* cited by examiner

*Primary Examiner* — Valentin Neacsu
*Assistant Examiner* — Hosam Shabara
(74) *Attorney, Agent, or Firm* — Jordan IP Law, LLC

(57) ABSTRACT

A vehicle, and an adjustable footrest peg mount assembly for such a vehicle that permits a rider to quickly and dynamically adjust, reorient, or otherwise reposition auxiliary (e.g., highway) foot pegs while the rider is seated in a normal riding position.

19 Claims, 5 Drawing Sheets

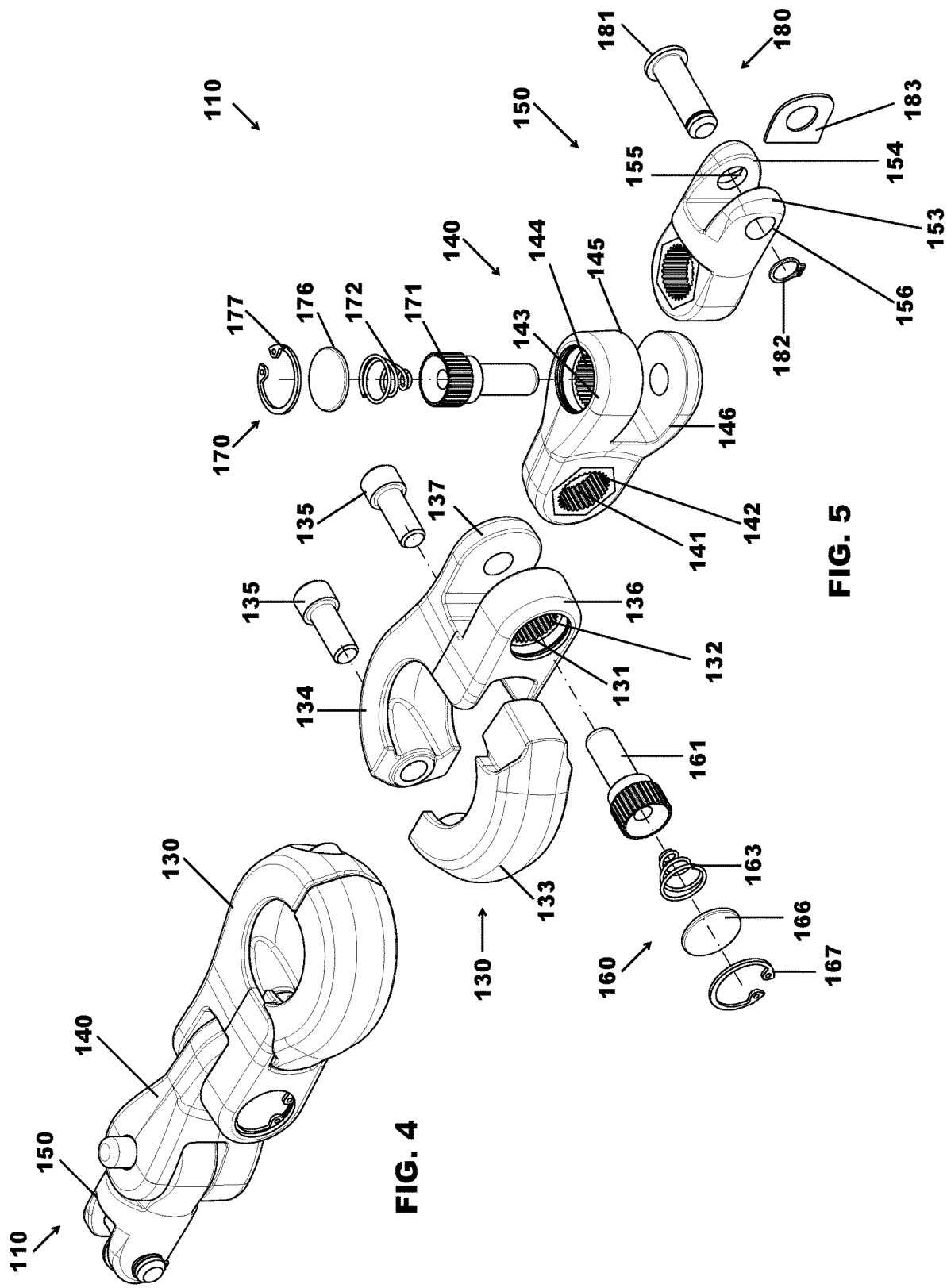

ADJUSTABLE FOOTREST PEG MOUNT ASSEMBLY

TECHNICAL FIELD

One or more embodiments relate generally to a vehicle, and an adjustable footrest peg mount assembly for such a vehicle that permits a rider to quickly and dynamically adjust, reorient, or otherwise reposition auxiliary (e.g., highway) foot pegs while the rider is seated in a normal riding position.

BACKGROUND

Conventional footrest peg mount designs either have a very limited range of motion or a limited usable range of motion, which may result in awkward foot positions of the user/rider. Conventional footrest peg mount designs also require the aid of mechanical tools to make an adjustment of the footrest position.

BRIEF SUMMARY

In accordance with one or more embodiments, a vehicle, such as, for example, a motorcycle, and an adjustable footrest peg mount assembly for such a vehicle are provided to facilitate quick and dynamic adjustment, reorientation, or otherwise repositioning of auxiliary (e.g., highway) foot pegs while the user/rider is seated in a normal riding position. The adjustable footrest peg mount assembly allows the user/rider to find an optimal position of the footrest for their stature and an ideal position to maximize foot/ankle comfort.

BRIEF DESCRIPTION OF THE SEVERAL VIEWS OF THE DRAWINGS

The various advantages of the embodiments of the present disclosure will become apparent to one skilled in the art by reading the following specification and appended claims, and by referencing the following drawings, in which:

FIG. 4 illustrates an exploded view of an example adjustable footrest peg mount assembly, in accordance with one or more embodiments set forth, illustrated, and described herein.

FIG. 5 illustrates a side view of an example adjustable footrest peg mount assembly, in accordance with one or more embodiments set forth, illustrated, and described herein.

DETAILED DESCRIPTION

Figure 1:
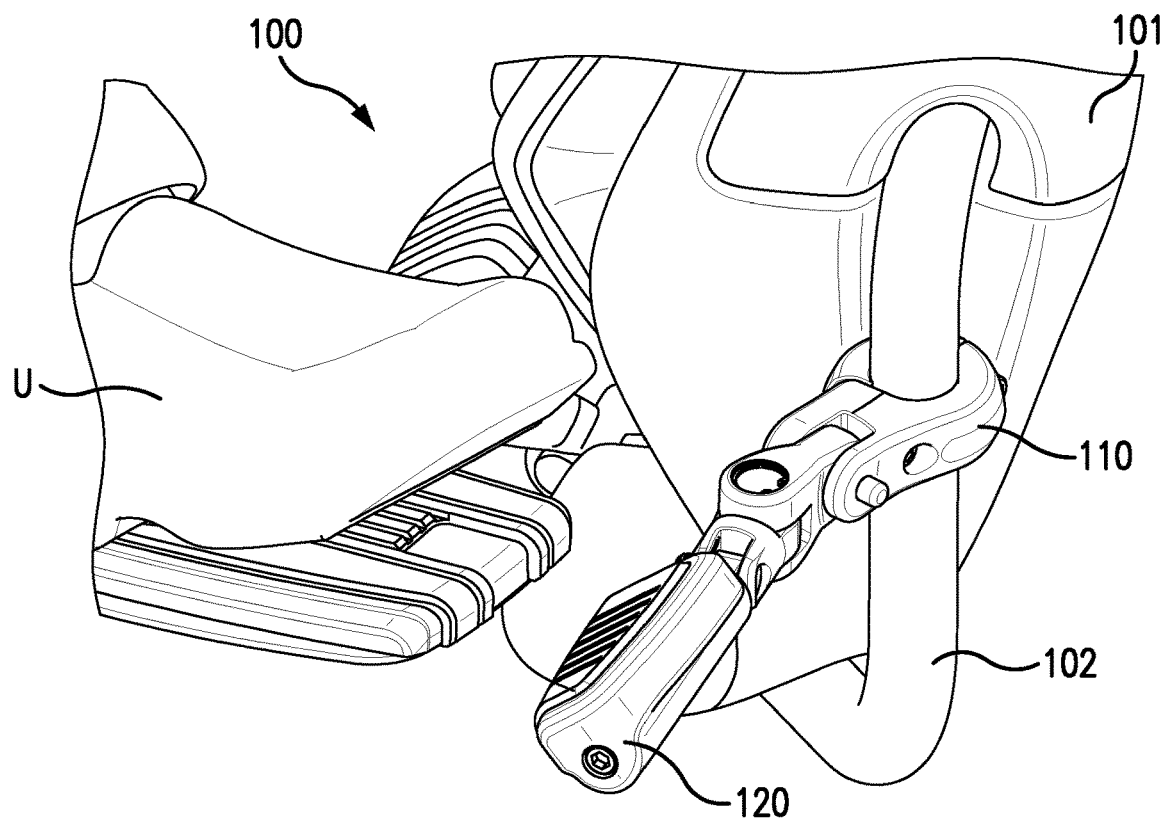
FIGS. 1 through 3 respectively illustrate an example vehicle having an example adjustable footrest peg mount assembly, in accordance with one or more embodiments set forth, illustrated, and described herein.
Figure 2:
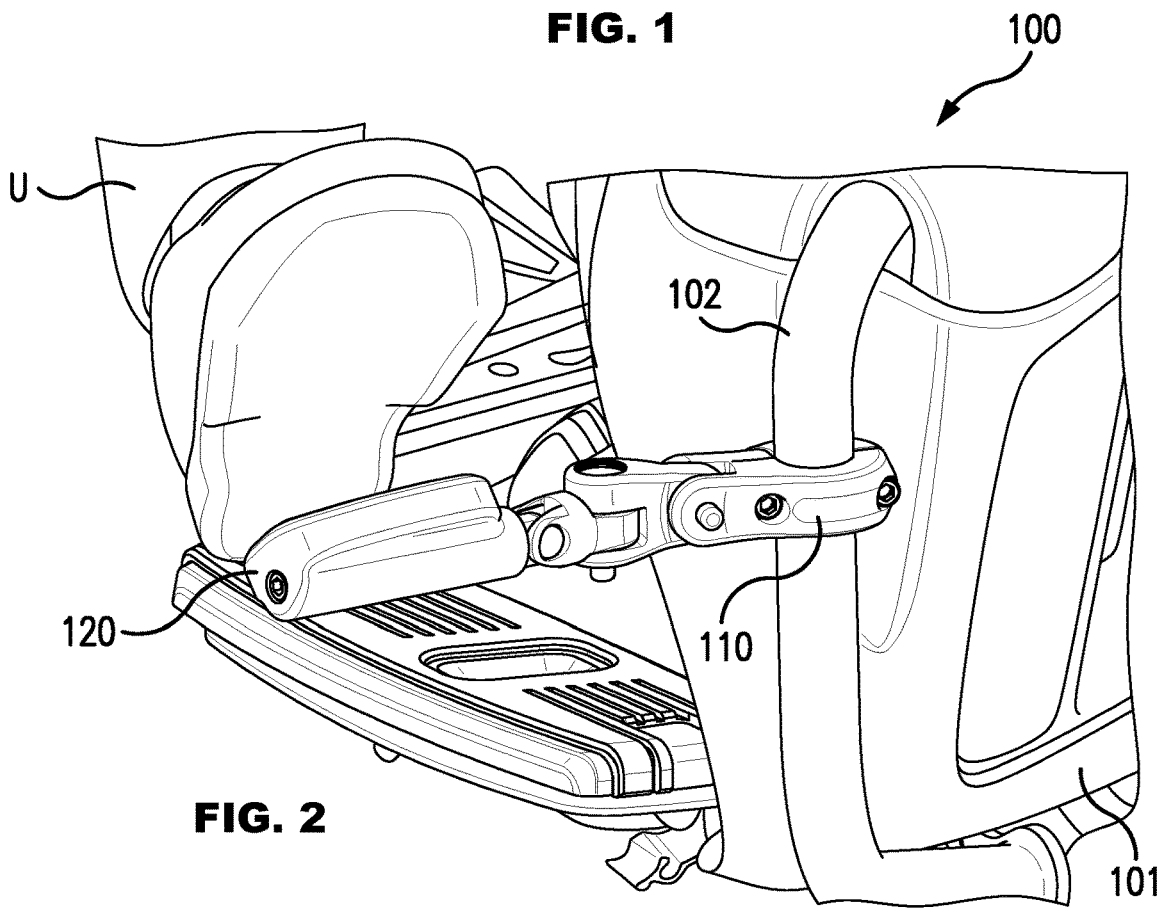
Figure 3:
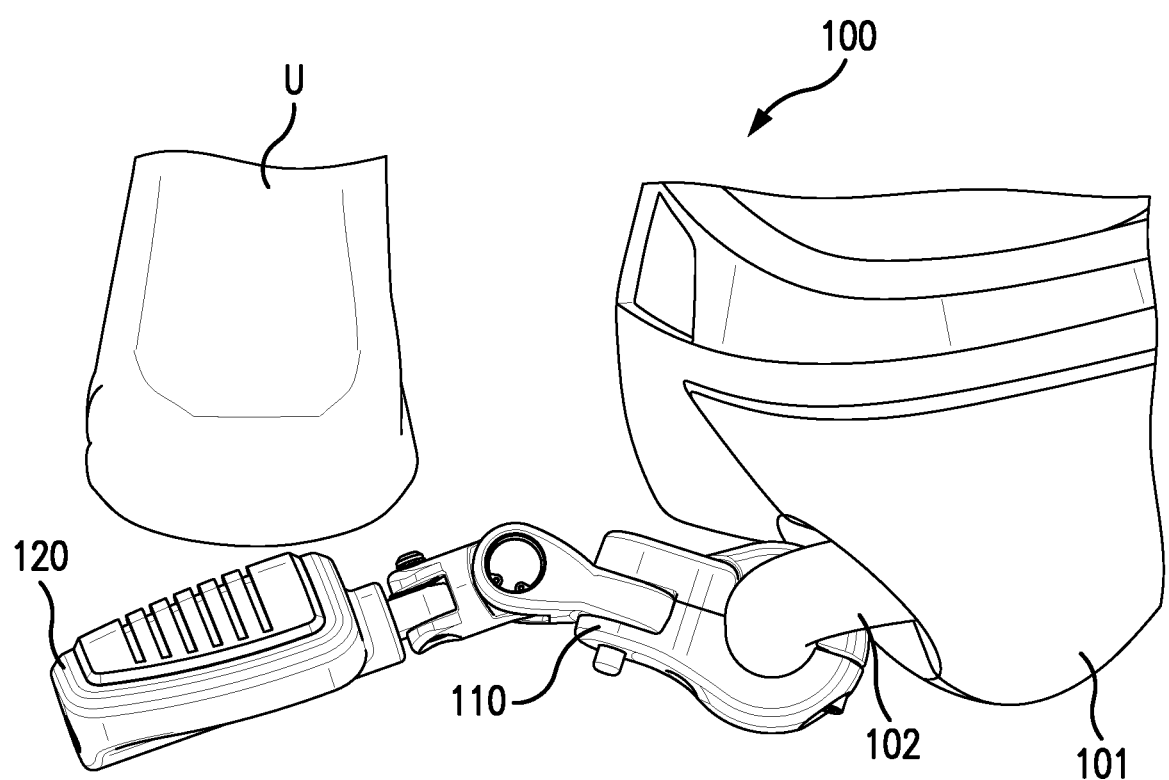
Figure 6:
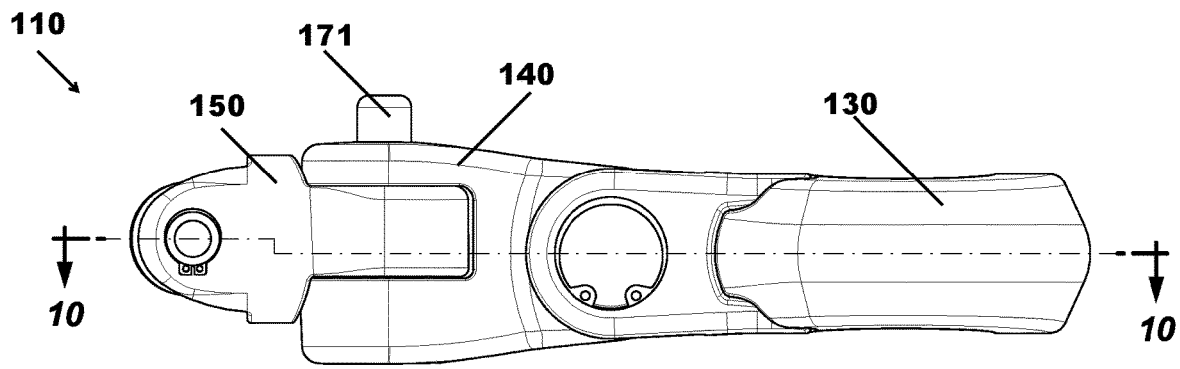
FIG. 6 illustrates a cross-sectional view of the example adjustable footrest peg mount assembly of FIG. 5.
Figure 7:
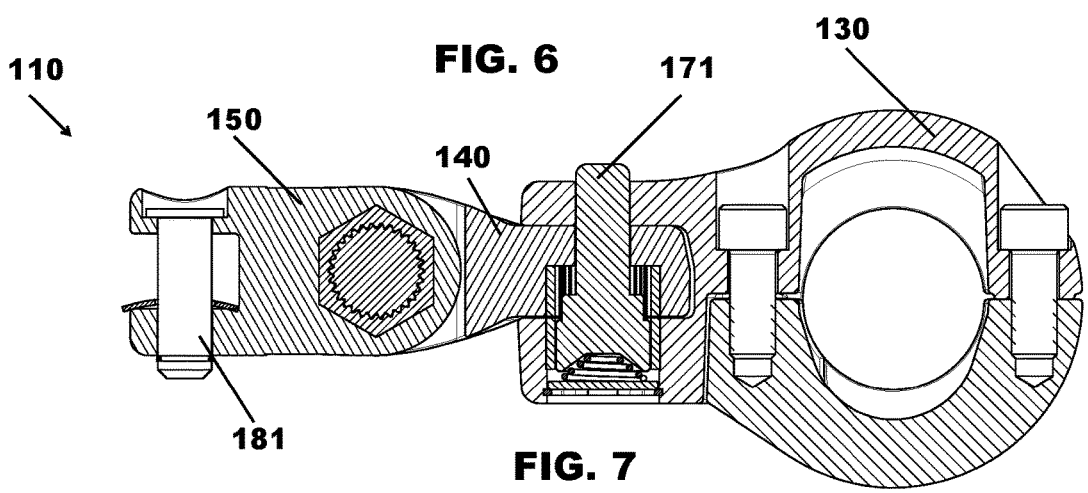
FIG. 7 illustrates a cross-sectional view of an example adjustable footrest peg mount assembly, in accordance with one or more embodiments set forth, illustrated, and described herein.
Figure 8:
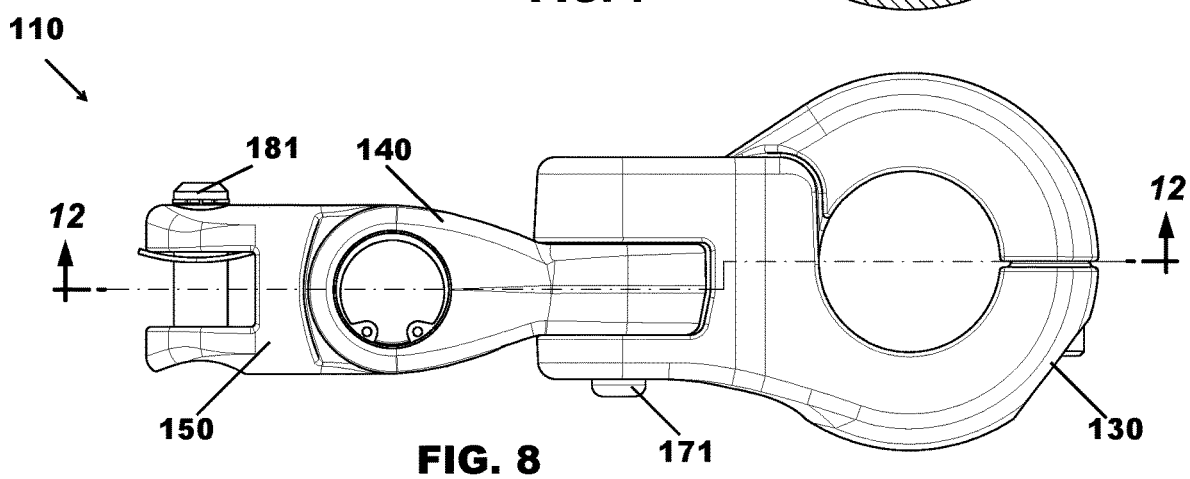
FIG. 8 illustrates a top view of the example adjustable footrest peg mount assembly of FIG. 7.
Figure 9:
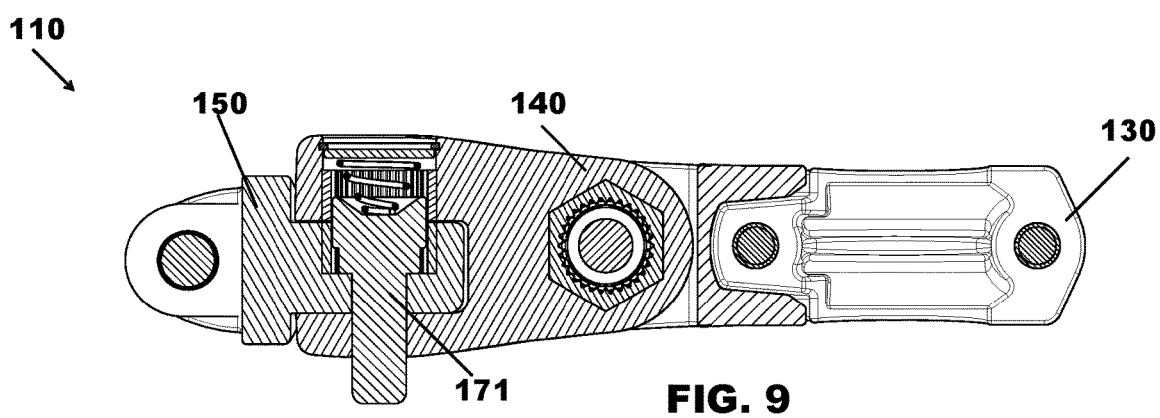
FIG. 9 illustrates a side view of the example adjustable footrest peg mount assembly of FIG. 7.

Turning to the figures, in which FIGS. 1 through 3 respectively illustrate an example vehicle 100, and an example adjustable footrest peg mount assembly 110 for the vehicle 100. In the illustrated examples, the vehicle 100 comprises a two-wheeled vehicle, such as, for example, a motorcycle. Embodiments, however, are not limited thereto, and thus, this disclosure contemplates the vehicle 100 comprising any suitable vehicle that falls within the spirit and scope of the principles of this disclosure.

As illustrated in FIGS. 1 through 3, the vehicle 100 comprises a vehicle structure 101 (e.g., chassis, frame, subframe, body, etc.), an engine guard 102 connected to the vehicle structure 101, the adjustable footrest peg mount assembly 110 removably connected on the engine guard 102, and a footrest 120 connected to the adjustable footrest peg mount assembly 110. Although the illustrated embodiments capture the adjustable footrest peg mount assembly 110 being connected at a specific point or region on the engine guard 102, embodiments are not limited thereto. This disclosure contemplates connection of the adjustable footrest peg mount assembly 110 at any point, region, or surface on the vehicle structure 101 or the engine guard 102.

In accordance with one or more embodiments, the adjustable footrest peg mount assembly 110 may not include one or more of the structural elements illustrated in FIGS. 3 through 8. The adjustable footrest peg mount assembly 110 may have additional elements to those illustrated in FIGS. 4 through 8. Moreover, while the various operational parameters or elements are illustrated as being located on engine guard 102, embodiments are not limited thereto. This disclosure contemplates mounting of the adjustable footrest peg mount assembly 110 at or on any component of the vehicle structure 101.

As illustrated in FIGS. 4 through 9, the adjustable footrest peg mount assembly 110 comprises a plurality of link members connected to the footrest 120 and operable to permit a rider or user U to selective find an optimal position or orientation of the footrest 120 without the use of mechanical tools. The link members include an inner or first link member 130, an intermediate or second link member 140, and an outer or third link member 150.

1$^{st}$ Link Member

As illustrated in FIGS. 4 through 9, the first link member 130 comprises a body having a first longitudinal or proximal end that is operable for direct connection to the engine guard 102, and a second longitudinal or distal end that is operable for direct connection to the second link member 140. The first link member 130 is composed in whole or in part of any metal material or metal alloy. In one example embodiment, the metal material comprises Zinc (Zn). Embodiments, however, are not limited thereto. This disclosure contemplates the first link member 130 being composed of any suitable material that falls within the spirit and scope of the principles of this disclosure. For example, the first link member 130 may be composed of a high strength composite material.

The first link member 130 has a bifurcated structural configuration that includes a first clamp half member 133 mechanically connected via one or more screw members 135 to a second clamp half member 134. When the first clamp half member 133 and the second clamp half member 134 are connected, the first longitudinal or proximal end of the first clamp half member 133 defines an opening sized to receive the engine guard 102. This bifurcated structural configuration facilitates a plurality of different mounting positions of the first link member 130 along the longitudinal length and curved sections of the engine guard 102 to achieve an optimal position of the adjustable footrest peg mount assembly 110 that accommodates the customized ergonomic demands and the physical profile of the user/rider U. The bifurcated structural configuration facilitates rotation of the first link member 130 relative to the engine guard 102 to further achieve an optimal position of the adjustable footrest peg mount assembly 110 that accommodates the customized ergonomic demands and the physical profile of the user/rider U.

The second longitudinal or distal end of the second clamp half member 134 comprises a first clevis fastener. The first clevis fastener comprises a first flange member 136 spaced apart from a second flange member 137. The first flange member 136 has a first bore 131 with internal splines 132 that, as disclosed herein, facilitates the selective locking and unlocking by the user/rider U of the second link member 140 to achieve and maintain the footrest 120 in one of a plurality of optimal or desired position or orientations that accommodates the customized ergonomic demands and the physical profile of the user/rider U. The internal splines 132 are composed in whole or in part of any metal material or metal alloy. In one example embodiment, the metal alloy comprises steel. Embodiments, however, are not limited thereto, and thus, this disclosure contemplates the internal splines 132 being composed of any suitable material that falls within the spirit and scope of the principles of this disclosure.

2$^{nd}$ Link Member

As also illustrated in FIGS. 4 through 9, the second link member 140 comprises a body having a first longitudinal or proximal end that is operable for direct connection to the first link member 130, and a second longitudinal or distal end that is operable for direct connection to the third link member 150. The second link member 140 is composed in whole or in part of any metal material or metal alloy. In one example embodiment, the metal material comprises Zinc (Zn). Embodiments, however, are not limited thereto, and thus, this disclosure contemplates the second link member 140 being composed of any suitable material that falls within the spirit and scope of the principles of this disclosure.

The first longitudinal or proximal end of the second link member 140 is operable for receipt in the space defined by the first clevis fastener of the first link member 130 to facilitate its connection to the first link member 130 at a first coupling region. The first longitudinal or proximal end has a second bore 141 with internal splines 142 that, as disclosed herein, facilitates the selective locking and unlocking by the user/rider U of the third link member 150 to achieve and maintain the footrest 120 in one of a plurality of optimal or desired position or orientations. The internal splines 142 are composed in whole or in part of any metal material or metal alloy. In one example embodiment, the metal alloy comprises steel. Embodiments, however, are not limited thereto, and thus, this disclosure contemplates the internal splines 142 being composed of any suitable material that falls within the spirit and scope of the principles of this disclosure.

When received in the space by the first clevis fastener, the first bore 131 and the second bore 141 are arranged in parallel at the first connection region. The second longitudinal or distal end of the second link member 140 comprises a second clevis fastener. The second clevis fastener comprises a third flange member 145 spaced apart from a fourth flange member 146. The third flange member 145 has a first bore 143 with internal splines 144 that, as disclosed herein, facilitates the selective locking and unlocking by the user/rider U of the third link member 150 to achieve and maintain the footrest 120 in one of a plurality of optimal or desired position or orientations that accommodates the customized ergonomic demands and the physical profile of the user/rider U. The internal splines 144 are composed in whole or in part of any metal material or metal alloy. In one example embodiment, the metal alloy comprises steel. Embodiments, however, are not limited thereto, and thus, this disclosure contemplates the internal splines 144 being composed of any suitable material that falls within the spirit and scope of the principles of this disclosure.

3$^{rd}$ Link Member

As further illustrated in FIGS. 4 through 9, the third link member 150 comprises a body having a first longitudinal or proximal end that is operable for direct connection to the second link member 140, and a second longitudinal or distal end that is operable for direct connection to the footrest 120. The third link member 150 is composed in whole or in part of any metal material or metal alloy. In one example embodiment, the metal material comprises Zinc (Zn). Embodiments, however, are not limited thereto, and thus, this disclosure contemplates the third link member 150 being composed of any suitable material that falls within the spirit and scope of the principles of this disclosure The first longitudinal or proximal end of the third link member 150 is operable for receipt in the space defined by the second clevis fastener of the second link member 140 to facilitate its connection to the second link member 140 at a second coupling region. The first longitudinal or proximal end has a fourth bore 151 with internal splines 152 that, as disclosed herein, facilitates the selective locking and unlocking by the user/rider U of the third link member 150 to achieve and maintain the footrest 120 in one of a plurality of optimal or desired position or orientations that accommodates the customized ergonomic demands and the physical profile of the user/rider U. The internal splines 152 are composed in whole or in part of any metal material or metal alloy. In one example embodiment, the metal alloy comprises steel. Embodiments, however, are not limited thereto, and thus, this disclosure contemplates the internal splines 152 being composed of any suitable material that falls within the spirit and scope of the principles of this disclosure.

When received in the space by the second clevis fastener, the third bore 143 and the fourth bore 151 are arranged in parallel at the second connection region. The second longitudinal or distal end of the third link member 150 comprises a third clevis fastener. The third clevis fastener comprises a fifth flange member 153 spaced apart from a sixth flange member 154. The fifth flange member 153 has a fifth bore 155 and the sixth flange member 154 has a sixth bore 156 that, as disclosed herein, facilitates the selective locking of the footrest 120.

1$^{st}$ Lock Assembly

As illustrated in FIG. 4, the adjustable footrest peg mount assembly 110 also comprises a first lock assembly 160 hat when engaged by the user/rider U, selectively places the first link member 130 and the second link member 140 in a locked connection to achieve and maintain the footrest 120 in one of a plurality of optimal or desired position or orientations. The first lock assembly 160 comprises a first clevis pin member 161 received in the first bore 131 and the second bore 141 to define a first pivot axis, and a first bias member 163 which is received in the first bore 131 and the second bore 141 to apply a bias force on the first clevis pin member 161 to maintain the locked connection between the first link member 130 and the second link member 140. The first bias member 163 may comprise, for example, a compression spring. Embodiments, however, are not limited thereto, and thus, this disclosure contemplates the first bias member 163 encompassing other types of springs that fall within the spirit and scope of the principles of this disclosure set forth herein. A retainer cap member 166 and a retainer ring 167 are also received in the first bore 131 and the second bore 141 to securely position and retain the first clevis pin member 161 in the first bore 131 and the second bore 141.

Figure 10:
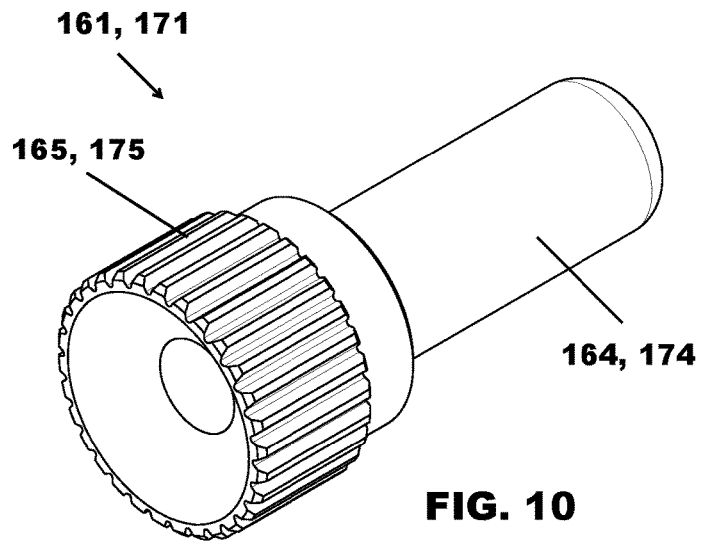
FIG. 10 illustrates a perspective view of a pin member for the example adjustable footrest peg mount assembly, in accordance with one or more embodiments set forth, illustrated, and described herein.
Figure 11:
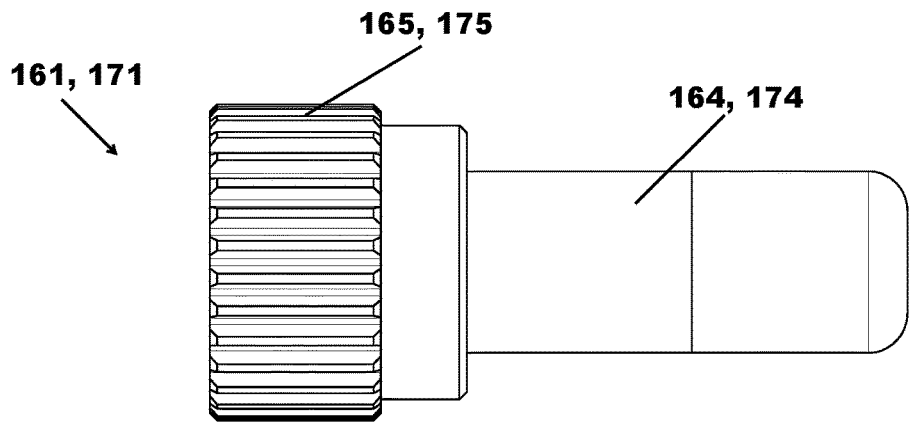
FIG. 11 illustrates a side view of the clevis pin member of FIG. 10.
Figure 12:
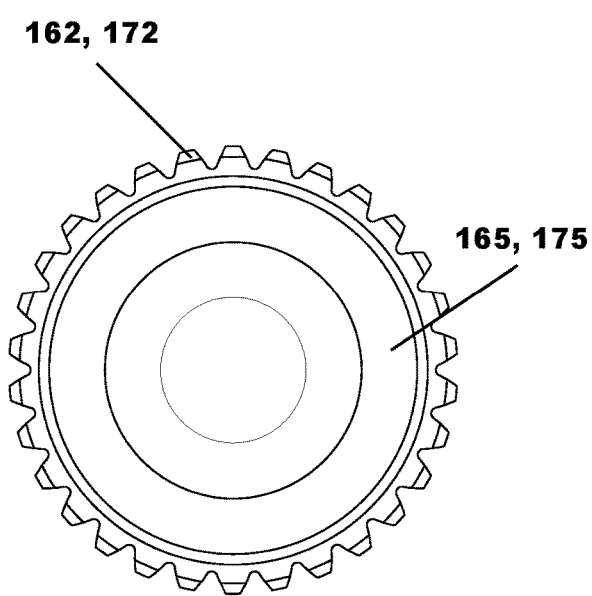
FIG. 12 illustrates a front view of the clevis pin member of FIG. 10.

As illustrated in FIGS. 10 through 12, the first clevis pin member 161 comprises a body having a first shaft member 164 and a first head member 165 that extends from the first shaft member 164. The first shaft member 164 is operable to extend through the first bore 131 and the second bore 141 in a manner such that a distal end of the first shaft member 164 is exposed at an outer side of the second flange member 137. This exposure of the distal end of the first shaft member 164 facilitates its selective engagement (i.e., direct physical contact) by the foot of the user/rider U in order to change the orientation of the second link member 140. The first clevis pin member 161 is composed in whole or in part of any metal material or metal alloy. In one example embodiment, the metal alloy comprises steel. Embodiments, however, are not limited thereto, and thus, this disclosure contemplates the first clevis pin member 161 being composed of any suitable material that falls within the spirit and scope of the principles of this disclosure.

The first clevis pin member 161 is selectively moveable by the user/rider U between a first position in which the first head member 165 is partially received in the first bore 131 and the second bore 141, and a second position in which the first head member 165 advances in a longitudinal direction to move completely out of the second bore 141 for full receipt in the first bore 131. In the first position, the locked connection between the first link member 130 and the second link member 140 is maintained under the bias force of the first bias member 163. In the second position, the locked connection between the first link member 130 and the second link member 140 is disengaged by release of the bias force of the first bias member 163 to facilitate rotation of the second link member 140 about the first pivot axis and thereby change the orientation of the second link member 140 relative to the first link member 130.

The first head member 165 comprises one or more external splines 162 that correspond to and engage the one or more internal splines 132 of the first bore 131 to facilitate rotation of the second link member 140 about the first pivot axis. The one or more external splines 162 also correspond to one or more internal splines 142 of the second link member 140 to maintain the locked connection between the first link member 130 and the second link member 140.

Selective engagement of the exposed distal end of the first shaft member 164 by the user/rider U releases the bias force exerted by the first bias member 163 to advance the first clevis pin member 161 forward longitudinally for receipt of the first head member 165 into the first bore 131. Such selective engagement disengages the locked connection between the first link member 130 and the second link member 140, which in turn facilitates selective rotation of the second link member 140 about the first pivot axis and thereby change the orientation of the second link member 140 relative to the first link member 130.

2$^{nd}$ Lock Assembly

As further illustrated in FIG. 4, the adjustable footrest peg mount assembly 110 further comprises a second lock assembly 170 that when engaged by the user/rider U, selectively places the second link member 140 and the third link member 150 in a locked connection to achieve and maintain the footrest 120 in one of a plurality of optimal or desired position or orientations. The second lock assembly 170 comprises a second clevis pin member 171 received in the third bore 143 and the fourth bore 151 to define a second pivot axis, and a second bias member 172 which is received in the third bore 143 and the fourth bore 151 to apply a bias force on the second clevis pin member 171 to maintain the locked connection between the second link member 140 and the third link member 150. The second bias member 172 may comprise, for example, a compression spring. Embodiments, however, are not limited thereto, and thus, this disclosure contemplates the second bias member 172 encompassing other types of springs that fall within the spirit and scope of the principles of this disclosure set forth herein. A retainer cap member 176 and a retainer ring 177 are also received in the third bore 143 and the fourth bore 151 to securely position and retain the second clevis pin member 171 in the third bore 143 and the fourth bore 151.

As further illustrated in FIGS. 10 through 12, the second clevis pin member 171 comprises a body having a second shaft member 174 and a second head member 175 that extends from the second shaft member 174. The second shaft member 174 is operable to extend through the third bore 143 and the fourth bore 151 in a manner such that a distal end of the second shaft member 174 is exposed at an outer side of the second flange member 146 for selective engagement (i.e., direct physical contact) by the foot of the user/rider U. The second clevis pin member 171 is composed in whole or in part of any metal material or metal alloy. In one example embodiment, the metal alloy comprises steel. Embodiments, however, are not limited thereto, and thus, this disclosure contemplates the second clevis pin member 171 being composed of any suitable material that falls within the spirit and scope of the principles of this disclosure The second clevis pin member 171 is selectively moveable by the user/rider U between a first position in which the second head member 175 is partially received in the third bore 143 and the fourth bore 151, and second position in which the second head member 175 advances in a longitudinal direction to move completely out of the fourth bore 151 for full receipt in the third bore 143. In the first position, the locked connection between the second link member 140 and the third link member 150 is maintained under the bias force of the second bias member 172. In the second position, the locked connection between the second link member 140 and the third link member 150 is disengaged by release of the bias force of the second bias member 172 to facilitate rotation of the third link member 150 about the second pivot axis and thereby change the orientation of the third link member 150 relative to the second link member 140.

The second head member 175 comprises one or more external splines 171 that correspond to and engage the one or more internal splines 144 of the third bore 143 to facilitate rotation of the third link member 150 about the second pivot axis. The one or more external splines 171 also correspond to maintain the locked connection between the second link member 140 and the third link member 150.

Selective engagement of the exposed distal end of the second shaft member 174 by the user/rider U releases the bias force exerted by the second bias member 172 to advance the second clevis pin member 171 forward longitudinally for receipt of the second head member 175 into the third bore 143. Such selective engagement disengages the locked connection between the second link member 140 and the third link member 150, which in turn facilitates selective rotation of the third link member 150 about the second pivot axis and thereby change the orientation of the third link member 150 relative to the second link member 140.

3$^{rd}$ Lock Assembly

As further illustrated in FIG. 4, the adjustable footrest peg mount assembly 110 further comprises a third lock assembly 180 that selectively places the footrest 120 and the third link member 150 in a locked connection. The second lock assembly 170 comprises a third clevis pin member 181 received in the fifth bore 155 and the sixth bore 156. An external retainer ring 182 is operable to securely position and retain the third clevis pin member 181 in the fifth bore 155 and the sixth bore 156. A washer member 183 is operable to maintain the connection between the footrest 120 and the third link member 150.

EXAMPLES

The disclosure further includes additional notes and examples, as set forth in the following clauses.

Clause 1A. An adjustable footrest peg mount assembly for a vehicle, comprising: a plurality of link members operable for connection to a footrest and the vehicle; and one or more lock assemblies, each lock assembly including a pin member defining a pivot axis, the pin member being selectively moveable by a user between a first position which maintains a locked connection between adjacent link members, and a second position which disengages the locked connection between the adjacent link members to facilitate rotation of the second link member about the first pivot axis in a manner that dynamically changes an orientation of the third link member relative to the second link member.

Clause 2A. The adjustable footrest peg mount assembly of Clause 1A, wherein: each adjacent link member comprises a clevis fastener having a bore with one or more internal splines, and the pin member comprises a body having a shaft member and a head member that extends from the shaft member, the head member including one or more external splines.

Clause 3A. The adjustable footrest peg mount assembly of Clause 2A, wherein: the one or more external splines also correspond to and engage the one or more internal splines of the bore of the first link member to facilitate rotation of the second link member about the pivot axis, and the one or more external splines also correspond to and engage the one or more internal splines of the bore of the second link member to maintain the locked connection between the first link member and the second link member.

Clause 4A. The adjustable footrest peg mount assembly of Clause 3A, wherein the shaft member is operable to extend through a respective bore of the adjacent link members in a manner that exposes a distal end of the shaft member for selective engagement by the user and thereby selectively longitudinally advance the pin member from the first position to the second position.

Clause 5A. The adjustable footrest peg mount assembly of Clause 4A, wherein each lock assembly further includes a bias member to apply a bias force on the pin member to maintain the locked connection between the adjacent link members.

Clause 6A. The adjustable footrest peg mount assembly of Clause 5A, wherein in the first position of the pin member, the head member is received in the bore of a first link member of the adjacent link members to maintain the locked connection between the adjacent link members under the bias force of the bias member.

Clause 7A. The adjustable footrest peg mount assembly of Clause 6A, wherein in the second position of the pin member, the head member in is received in the bore of a second link member of the adjacent link members to disengage the locked connection between the adjacent link members by release of the bias force of the bias member.

Clause 1B. An adjustable footrest peg mount assembly for a vehicle, comprising: a plurality of link members including a first link member operable for connection to the vehicle, and a second link member operable for connection to the first link member, and a third link member operable for connection to the second link member and the footrest; and a first lock assembly including a first pin member defining a first pivot axis, the first pin member being selectively moveable by a user between a first position which maintains a locked connection between the first link member and the second link member, and a second position which disengages the locked connection between the first link member and the second link member to facilitate rotation of the second link member about the first pivot axis in a manner that changes an orientation of the second link member relative to the first link member; and a second lock assembly including a second pin member defining a second pivot axis, the second pin member being selectively moveable by a user between a first position which maintains a locked connection between the second link member and the third link member, and a second position which disengages the locked connection between the second link member and the third link member to facilitate rotation of the third link member about the second pivot axis in a manner that dynamically changes an orientation of the third link member relative to the second link member.

Clause 2B. The adjustable footrest peg mount assembly of Clause 1B, wherein the first lock assembly further includes a first bias member to apply a bias force on the first pin member to maintain the locked connection between the first link member and the second link member.

Clause 3B. The adjustable footrest peg mount assembly of Clause 2B, wherein the first pin member is selectively moveable by a selective engagement of an exposed end thereof by the user to release the bias force on the first pin member.

Clause 4B. The adjustable footrest peg mount assembly of Clause 1B, wherein the second lock assembly further includes a second bias member to apply a bias force on the second pin member to maintain the locked connection between the second link member and the third link member.

Clause 5B. The adjustable footrest peg mount assembly of Clause 4B, the second pin member is selectively moveable by a selective engagement of an exposed end thereof by the user to release the bias force on the second pin member.

Clause 6B. The adjustable footrest peg mount assembly of Clause 1B, wherein: the first link member comprises a first clevis fastener that includes a first flange member spaced apart from a second flange member, the first flange member having a first bore with internal splines, and the second link member comprises a second clevis fastener that includes a second bore with internal splines that facilitates the selective locking and unlocking by the user of the third link member to achieve and maintain the footrest in one of a plurality of optimal or desired position or orientations.

Clause 1C. An adjustable footrest peg mount assembly for a vehicle, comprising: a first link member operable for connection to the vehicle, and a second link member operable for connection to the first link member and the footrest; and a lock assembly including a pin member defining a pivot axis, the pin member being selectively moveable by a user between a first position which maintains a locked connection between the first link member and the second link member, and a second position which disengages the locked connection between the first link member and the second link member to facilitate rotation of the second link member about the pivot axis in a manner that dynamically changes an orientation of the second link member relative to the first link member.

Clause 2C. The adjustable footrest peg mount assembly of Clause 1C, wherein the first link member comprises a first clevis fastener having a first bore with one or more internal splines.

Clause 3C. The adjustable footrest peg mount assembly of Clause 2C, wherein the second link member comprises a second clevis fastener having a second bore with one or more internal splines.

Clause 4C. The adjustable footrest peg mount assembly of Clause 3C, wherein the pin member comprises a body having a shaft member and a head member that extends from the shaft member, the head member including one or more external splines that correspond to the one or more internal splines of the first bore and the one or more internal splines of the second bore.

Clause 5C. The adjustable footrest peg mount assembly of Clause 4C, wherein in the first position of the pin member, the one or more external splines engage the one or more internal splines of the bore of the second link member to maintain the locked connection between the first link member and the second link member.

Clause 6C. The adjustable footrest peg mount assembly of Clause 5C, wherein in the second position of pin member, the one or more external splines engage the one or more internal splines of the bore of the first link member to facilitate rotation of the second link member about the pivot axis.

Clause 7C. The adjustable footrest peg mount assembly of Clause 1C, wherein in the first position of the pin member, an exposed distal end of the pin member is operable for selective engagement by the user to thereby longitudinally advance the pin member from the first position to the second position.

Clause 8C. The adjustable footrest peg mount assembly of Clause 1C, wherein the lock assembly further includes a bias member to apply a bias force on the pin member to maintain the locked connection between the first link member and the second link member.

Clause 1D. An adjustable footrest peg mount assembly for a vehicle, comprising: a first link member operable for connection to the vehicle, a second link member operable for connection to the first link member, and a third link member operable for connection to the second link member and the footrest; a first lock assembly including a first pin member defining a first pivot axis, the first pin member being selectively moveable by a user between a first position which maintains a locked connection between the first link member and the second link member, and a second position which disengages the locked connection between the first link member and the second link member to facilitate rotation of the second link member about the first pivot axis in a manner that dynamically changes an orientation of the second link member relative to the first link member; and a second lock assembly including a second pin member defining a second pivot axis, the second pin member being selectively moveable by a user between a first position which maintains a locked connection between the second link member and the third link member, and a second position which disengages the locked connection between the second link member and the third link member to facilitate rotation of the third link member about the second pivot axis in a manner that dynamically changes an orientation of the third link member relative to the second link member.

Clause 2D. The adjustable footrest peg mount assembly of Clause 1D, wherein the first link member comprises a first clevis fastener having a first bore with one or more internal splines.

Clause 3D. The adjustable footrest peg mount assembly of Clause 2D, wherein the second link member comprises a second clevis fastener having a second bore with one or more internal splines at a proximal end thereof and a third bore with one or more internal splines at a distal end thereof.

Clause 4D. The adjustable footrest peg mount assembly of Clause 3D, wherein the third link member comprises a second clevis fastener having a fourth bore with one or more internal splines.

Clause 5D. The adjustable footrest peg mount assembly of Clause 4D, wherein the first pin member comprises a body having a first shaft member and a first head member that extends from the first shaft member, the first head member including one or more external splines that correspond to the one or more internal splines of the first bore and the one or more internal splines of the second bore.

Clause 6D. The adjustable footrest peg mount assembly of Clause 5D, wherein in the first position of the first pin member, the one or more external splines engage the one or more internal splines of the first bore of the first link member and the one or more internal splines of the second bore of the second link member to maintain the locked connection between the first link member and the second link member.

Clause 7D. The adjustable footrest peg mount assembly of Clause 6D, wherein in the second position of first pin member, the one or more external splines engage the one or more internal splines of the first bore of the first link member to facilitate rotation of the second link member about the first pivot axis.

Clause 8D. The adjustable footrest peg mount assembly of Clause 5D, wherein in the first position of the first pin member, an exposed distal end of the first pin member is operable for selective engagement by the user to thereby advance the first pin member from the first position to the second position.

Clause 9D. The adjustable footrest peg mount assembly of Clause 8D, wherein the first lock assembly further includes a first bias member to apply a bias force on the first pin member to maintain the locked connection between the first link member and the second link member.

Clause 10D. The adjustable footrest peg mount assembly of Clause 4D, wherein the second pin member comprises a body having a second shaft member and a second head member that extends from the second shaft member, the second head member including one or more external splines that correspond to the one or more internal splines of the third bore and the one or more internal splines of the fourth bore.

Clause 11D. The adjustable footrest peg mount assembly of Clause 10D, wherein in the first position of the second pin member, the one or more external splines engage the one or more internal splines of the third bore of the second link member and the one or more internal splines of the fourth bore of the third link member to maintain the locked connection between the second link member and the third link member.

Clause 12D. The adjustable footrest peg mount assembly of Clause 11D, wherein in the second position of second pin member, the one or more external splines engage the one or more internal splines of the third bore of the second link member to facilitate rotation of the third link member about the second pivot axis.

Clause 13D. The adjustable footrest peg mount assembly of Clause 10D, wherein in the first position of the second pin member, an exposed distal end of the second pin member is operable for selective engagement by the user to thereby advance the second pin member from the first position to the second position.

Clause 14D. The adjustable footrest peg mount assembly of Clause 13D, wherein the second lock assembly further includes a second bias member to apply a bias force on the second pin member to maintain the locked connection between the second link member and the third link member.

Clause 1E. A vehicle, comprising: a vehicle structure; a footrest; and an adjustable footrest peg mount assembly, that includes: a first link member operable for connection to the engine guard, and a second link member operable for connection to the first link member and the footrest; and a lock assembly including a pin member defining a pivot axis, the pin member being selectively moveable by a user between a first position which maintains a locked connection between the first link member and the second link member, and a second position which disengages the locked connection between the first link member and the second link member to facilitate rotation of the second link member about the pivot axis in a manner that dynamically changes an orientation of the second link member relative to the first link member.

Clause 2E. The vehicle of Clause 1E, wherein the first link member comprises a first clevis fastener having a first bore with one or more internal splines.

Clause 3E. The vehicle of Clause 2E, wherein the second link member comprises a second clevis fastener having a second bore with one or more internal splines.

Clause 4E. The vehicle of Clause 3E, wherein the pin member comprises a body having a shaft member and a head member that extends from the shaft member, the head member including one or more external splines that correspond to the one or more internal splines of the first bore and the one or more internal splines of the second bore.

Clause 5E. The vehicle of Clause 4E, wherein in the first position of the pin member, the one or more external splines engage the one or more internal splines of the bore of the second link member to maintain the locked connection between the first link member and the second link member.

Clause 6E. The vehicle of Clause 5E, wherein in the second position of pin member, the one or more external splines engage the one or more internal splines of the bore of the first link member to facilitate rotation of the second link member about the pivot axis.

Clause 7E. The vehicle of Clause 1E, wherein in the first position of the pin member, an exposed distal end of the pin member is operable for selective engagement by the user to thereby longitudinally advance the pin member from the first position to the second position.

Clause 8E. The vehicle of Clause 1E, wherein the lock assembly further includes a bias member to apply a bias force on the pin member to maintain the locked connection between the first link member and the second link member.

Clause 9E. The vehicle of Clause 1E, wherein the vehicle comprises a two-wheeled vehicle.

The terms "coupled," "attached," or "connected" may be used herein to refer to any type of relationship, direct or indirect, between the components in question, and may apply to electrical, mechanical, fluid, optical, electromagnetic, electro-mechanical or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action may occur, either in a direct or indirect manner.

Those skilled in the art will appreciate from the foregoing description that the broad techniques of the embodiments of the present disclosure may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. An adjustable footrest peg mount assembly for a vehicle, comprising:
    a plurality of link members operable for connection to a footrest and the vehicle; and
    one or more lock assemblies, each lock assembly including a pin member comprising a body defining a pivot axis, the body having a shaft member and a head member that extends from the shaft member, the head member including one or more external splines, the pin member being selectively moveable by a user between a first position which maintains a locked connection between adjacent link members, and a second position which disengages the locked connection between the adjacent link members to facilitate rotation of a second link member of the adjacent link members about the first pivot axis in a manner that dynamically changes an orientation of the second link member relative to a first link member of the adjacent link members, wherein each adjacent link member comprises a clevis fastener having a bore with one or more internal splines.

2. The adjustable footrest peg mount assembly of claim 1, wherein:
    the one or more external splines also correspond to and engage the one or more internal splines of the bore of the first link member to facilitate rotation of the second link member about the pivot axis, and
    the one or more external splines also correspond to and engage the one or more internal splines of the bore of the first link member and the one or more internal splines of the bore of the second link member to maintain the locked connection between the first link member and the second link member.

3. The adjustable footrest peg mount assembly of claim 2, wherein the shaft member is operable to extend through a respective bore of the adjacent link members in a manner that exposes a distal end of the shaft member for selective engagement by the user and thereby selectively longitudinally advance the pin member from the first position to the second position.

4. The adjustable footrest peg mount assembly of claim 3, wherein each lock assembly further includes a bias member to apply a bias force on the pin member to maintain the locked connection between the adjacent link members.

5. The adjustable footrest peg mount assembly of claim 4, wherein in the first position of the pin member, the head member is received in the bore of a first link member of the adjacent link members to maintain the locked connection between the adjacent link members under the bias force of the bias member.

6. The adjustable footrest peg mount assembly of claim 5, wherein in the second position of the pin member, the head member in is received in the bore of a second link member of the adjacent link members to disengage the locked connection between the adjacent link members by release of the bias force of the bias member.

7. An adjustable footrest peg mount assembly for a vehicle, comprising:
a first link member operable for connection to the vehicle, and a second link member operable for connection to the first link member and a footrest; and
a lock assembly including a pin member defining a pivot axis, the pin member being selectively moveable by a user seated on the vehicle in a riding position between a first position which maintains a locked connection between the first link member and the second link member, and a second position which disengages the locked connection between the first link member and the second link member to facilitate rotation of the second link member about the pivot axis in a manner that dynamically changes an orientation of the second link member relative to the first link member and thereby reorient the footrest between one of a plurality of orientations while the user is seated on the vehicle in the riding position.

8. The adjustable footrest peg mount assembly of claim 7, wherein:
the first link member comprises a first clevis fastener having a first bore with one or more internal splines, and
the second link member comprises a second clevis fastener having a second bore with one or more internal splines.

9. The adjustable footrest peg mount assembly of claim 8, wherein the pin member comprises a body having a shaft member and a head member that extends from the shaft member, the head member including one or more external splines that correspond to the one or more internal splines of the first bore and the one or more internal splines of the second bore.

10. The adjustable footrest peg mount assembly of claim 9, wherein:
in the first position of the pin member, the one or more external splines engage the one or more internal splines of the bore of the first link member and the one or more internal splines of the bore of the second link member to maintain the locked connection between the first link member and the second link member, and
in the second position of pin member, the one or more external splines engage the one or more internal splines of the bore of the first link member to facilitate rotation of the second link member about the pivot axis.

11. The adjustable footrest peg mount assembly of claim 7, wherein in the first position of the pin member, an exposed distal end of the pin member is operable for selective engagement by the user to thereby longitudinally advance the pin member from the first position to the second position.

12. The adjustable footrest peg mount assembly of claim 7, wherein the lock assembly further includes a bias member to apply a bias force on the pin member to maintain the locked connection between the first link member and the second link member.

13. A vehicle, comprising:
a vehicle structure;
a footrest; and
an adjustable footrest peg mount assembly, that includes:
a first link member operable for connection to the vehicle structure, and a second link member operable for connection to the first link member and the footrest; and
a lock assembly including a pin member defining a pivot axis, the pin member being selectively moveable by a user seated on the vehicle in a riding position between a first position which maintains a locked connection between the first link member and the second link member, and a second position which disengages the locked connection between the first link member and the second link member to facilitate rotation of the second link member about the pivot axis in a manner that dynamically changes an orientation of the second link member relative to the first link member and thereby reorient the footrest between one of a plurality of orientations while the user is seated on the vehicle in the riding position.

14. The vehicle of claim 13, wherein:
the first link member comprises a first clevis fastener having a first bore with one or more internal splines, and
the second link member comprises a second clevis fastener having a second bore with one or more internal splines.

15. The vehicle of claim 14, wherein the pin member comprises a body having a shaft member and a head member that extends from the shaft member, the head member including one or more external splines that correspond to the one or more internal splines of the first bore and the one or more internal splines of the second bore.

16. The vehicle of claim 15, wherein:
in the first position of the pin member, the one or more external splines engage the one or more internal splines of the bore of the first link member and the one or more internal splines of the bore of the second link member to maintain the locked connection between the first link member and the second link member, and
in the second position of pin member, the one or more external splines engage the one or more internal splines of the bore of the first link member to facilitate rotation of the second link member about the pivot axis.

17. The vehicle of claim 13, wherein in the first position of the pin member, an exposed distal end of the pin member is operable for selective engagement by the user to thereby longitudinally advance the pin member from the first position to the second position.

18. The vehicle of claim 13, wherein the lock assembly further includes a bias member to apply a bias force on the pin member to maintain the locked connection between the first link member and the second link member.

19. The vehicle of claim 13, wherein the vehicle comprises a two-wheeled vehicle.

* * * * *